United States Patent
Hrecznyj et al.

(10) Patent No.: US 12,005,758 B1
(45) Date of Patent: Jun. 11, 2024

(54) THERMALLY MANAGED STORAGE SYSTEM FOR A VEHICLE

(71) Applicant: Ford Global Technologies, LLC, Dearborn, MI (US)

(72) Inventors: Michael Hrecznyj, Livonia, MI (US); Michael M. Azzouz, Farmington, MI (US); Scott Nydam, Farmington Hills, MI (US); Marcos Silva Kondrad, Macomb Township, MI (US); Kevin Wayne Preuss, Berkley, MI (US); Chris Robert Sculthorpe, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/073,803

(22) Filed: Dec. 2, 2022

(51) Int. Cl.
*B60H 1/00* (2006.01)

(52) U.S. Cl.
CPC ....... *B60H 1/0055* (2013.01); *B60H 1/00821* (2013.01)

(58) Field of Classification Search
CPC ............. B60H 1/0055; B60H 1/00821
See application file for complete search history.

(56) References Cited

U.S. PATENT DOCUMENTS

| | | | | |
|---|---|---|---|---|
| 3,850,006 A | * | 11/1974 | Redfern | F25D 3/005 62/298 |
| 4,103,510 A | * | 8/1978 | Hall | F25D 15/00 62/457.2 |
| 4,637,222 A | | 1/1987 | Fujiwara et al. | |
| 4,936,103 A | * | 6/1990 | Newman | B60H 1/00592 211/186 |
| 10,207,804 B1 | * | 2/2019 | Gentry | B64D 13/06 |
| 10,953,721 B2 | | 3/2021 | Gruber | |
| 11,148,602 B2 | | 10/2021 | Ahlning | |
| 2005/0204763 A1 | * | 9/2005 | Smith | B60H 1/00014 62/239 |
| 2010/0051616 A1 | * | 3/2010 | Shea | B65D 81/3823 220/4.28 |
| 2018/0037150 A1 | | 2/2018 | Rotharmel | |

FOREIGN PATENT DOCUMENTS

| | | |
|---|---|---|
| CN | 102320257 A | 1/2012 |
| DE | 102012204160 A1 | 9/2013 |
| DE | 102016203084 A1 | 9/2017 |
| DE | 102020135071 A1 | 7/2021 |
| WO | 2021245557 A1 | 12/2021 |

OTHER PUBLICATIONS

Tesla Model S Front Trunk (Frunk) Electric Cooler Review, 9 pages, posted on Jan. 31, 2014, www.teslarati.com/tesla-model-s-front-trunk-frunk-cooler/.

* cited by examiner

*Primary Examiner* — Emmanuel E Duke

(74) *Attorney, Agent, or Firm* — Vichit Chea; Price Heneveld LLP

(57) ABSTRACT

A thermally managed storage system for a vehicle that includes a partition structure that couples with and is expandable in a compartment of the vehicle. The partition structure includes a first wall fixed with the compartment and a plurality of second walls that are each moveable between a retracted position and an extended position. The plurality of second walls forms a space between the first wall and the plurality of second walls in the extended position. A casing is disposed in a space and selectively couples with a climate control system of the vehicle via a fluid connection with the compartment.

20 Claims, 6 Drawing Sheets

THERMALLY MANAGED STORAGE SYSTEM FOR A VEHICLE

FIELD OF THE DISCLOSURE

The present disclosure generally relates to a thermally managed storage system for a vehicle and, more particularly, relates to, an expandable cooling enclosure that selectively couples with a compartment of the vehicle.

BACKGROUND OF THE DISCLOSURE

Compartments for vehicles can be climate controlled. For example, some compartments may be configured for heating or cooling items in the compartment. Alternatively, a climate controlled case may be disposed in a dedicated location in the vehicle. However, conventional climate controlled cases typically do not couple with onboard heating or cooling devices associated with the vehicle. Further, typical climate-controlled cases are not selectively expandable or concealable in a region of the vehicle. A need is presented for a dynamic arrangement that allows for both space optimization and effective portability.

SUMMARY OF THE DISCLOSURE

According to a first aspect of the present disclosure, a thermally managed storage system for a vehicle includes a partition structure that couples with and is expandable in a compartment of the vehicle. The partition structure includes a first wall fixed with the compartment and a plurality of second walls that are each moveable between a retracted position and an extended position. The plurality of second walls forms a space between the first wall and the plurality of second walls in the extended position. A casing is disposed in the compartment and selectively couples with a climate control system of the vehicle via a fluid connection with the compartment.

Embodiments of the first aspect of the present disclosure can include any one or a combination of the following features:
- the plurality of second walls includes first and second sidewalls and an end wall extending between the first and second sidewalls;
- a first hinge member couples the first wall with the first sidewall, a second hinge member couples the end wall with the first sidewall, and a third hinge member couples the second sidewall with the end wall;
- an interface selectively coupling the second sidewall with the first wall when the plurality of second walls are in the extended position;
- the casing is selectively removable from the fluid connection and the compartment, and wherein the partition structure is fixed with the compartment;
- the end wall is configured to remain substantially parallel with the first wall during a movement of the plurality of second walls between the retracted and extended positions;
- each of the plurality of sidewalls includes a first partition and a second partition coupled together via a first hinge;
- comprises a pair of second hinges interconnecting the second partitions with the end wall. The pair of second hinges are configured to translate relative to the first wall during the movement, and each first hinge is configured to rotate relative to the end wall during the movement;
- at least one lower panel pivotally coupled with at least one of the first wall and the end wall to form a floor of the partition structure when unfolded;
- the at least one lower panel includes a first lower panel pivotably coupled with the first wall and a second lower panel pivotably coupled with the end wall;
- the casing, the plurality of second walls, and the first and second lower panels have an order in the retracted position. The order includes the casing disposed between the first wall and the first lower panel. The first and second lower panels are disposed between the first wall and the end wall. The plurality of sidewalls is disposed between the first and second lower panels;
- securing mechanisms are disposed adjacent an upper edge of the end wall for receiving one end of the casing. The securing mechanisms are configured to support the casing to form a top portion of the casing extending across the space;
- the casing defines an interior in fluid communication with the climate control system of the vehicle;
- a concealment partition extends from a periphery of the first wall to conceal outer edges of the plurality of second walls; and
- the first and plurality of second walls are thermally insulated to limit heat transfer between the space and a remainder of the compartment.

According to a second aspect of the present disclosure, a method of operating a thermally managed storage system for a vehicle includes unfolding, from a first wall coupled with a compartment of the vehicle, a plurality of second walls to define a space between the first wall and the plurality of second walls. The method further includes extending a casing coupled with the first wall across the space to expand an interior of the casing in the space. The method further includes coupling the casing with a securing mechanism disposed with at least one of the plurality of second walls to hold the casing in an extended position. The method further includes adjusting, via a climate control system of the vehicle, a climate of the interior. The climate control system includes a fluid connection with the interior at the first wall.

Embodiments of the second aspect of the present disclosure can include any one or a combination of the following features:
- housing, in a folded position of the plurality of second walls, the plurality of second walls and the casing with the first wall via a concealment partition extending from a periphery of the first wall.

According to a third aspect of the present disclosure, a thermally managed storage system for a vehicle includes a partition structure coupled with and expandable in a compartment of the vehicle. The partition structure includes a first wall fixed with the compartment. A plurality of second walls are each moveable between a retracted position and an extended position. The plurality of second walls includes first and second sidewalls and an end wall extending between the first and second sidewalls and defining a space between the first wall and the end wall. A casing is disposed in the space and selectively coupled with a climate control system of the vehicle via a fluid connection with the first wall. The securing mechanisms are disposed adjacent an upper edge of the partition structure for receiving one end of the casing. The securing mechanisms are configured to support the casing to form a top portion of the casing extending across the space. A controller in communication with the climate control system is configured to adjust fluid communication between the climate control system and an interior of the casing.

Embodiments of the third aspect of the present disclosure can include any one or a combination of the following features:
- the end wall is configured to remain substantially parallel with the first wall during a movement of the plurality of second walls between the retracted and extended positions; and
- the partition structure is configured to selectively decouple from the compartment and selectively decouple the casing from the fluid connection.

These and other features, advantages, and objects of the present invention will be further understood and appreciated by those skilled in the art by reference to the following specification, claims, and appended drawings.

DETAILED DESCRIPTION OF PREFERRED EMBODIMENTS

Figure 1:
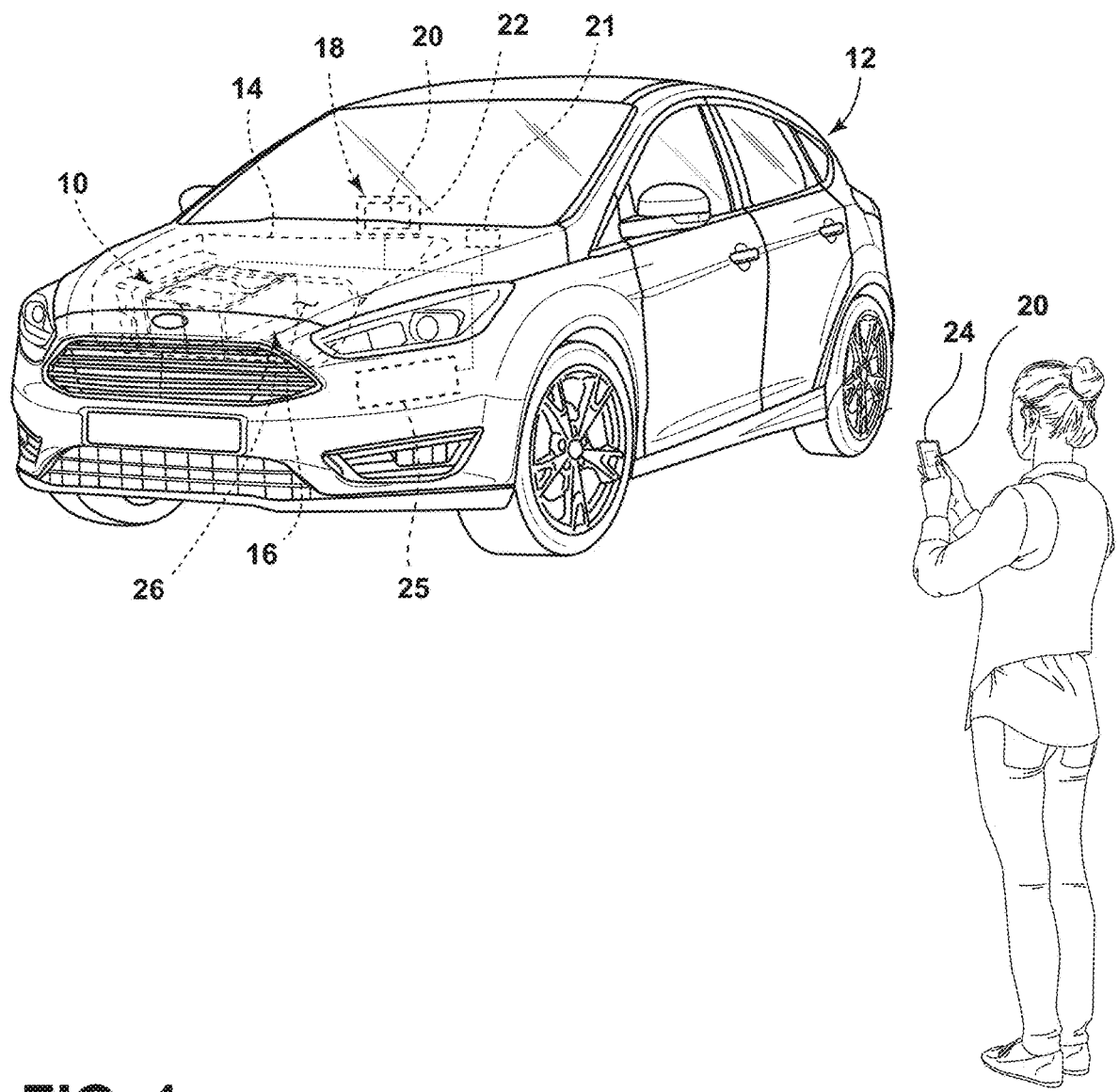
FIG. 1 is a perspective view of a vehicle incorporating a thermally managed storage system of the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a thermally managed storage system for a vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In general, the present disclosure may provide for a climate controlled thermal structure selectively disposed in an interior space of the vehicle. The interior space may be a preformed cavity within the vehicle that is capable of housing the thermal structure, such as a cooler, and securing the thermal structure to a structure that defines the interior space (e.g., an outer wall of the cavity). The thermal structure may be permanently or temporarily secured with the outer wall or otherwise within the interior space, such that the thermal structure may be removed from the interior space or configured to be kept in the interior space. In examples in which the thermal structure may be removed from the interior space (e.g., a portable cooler), an environment of the interior space may be climate controlled. In this way, environmental conditions of the interior space as a whole and/or environmental conditions of an expandable or removable thermal structure may be controlled.

Referring generally to the figures, the present disclosure provides for a thermally managed storage system 10 for use in a vehicle 12. Although generally illustrated in the figures as being incorporated with a front trunk of the vehicle 12, also commonly referred to as a frunk of an electric vehicle, it is contemplated that the thermally managed storage system 10 of the present disclosure may be incorporated with any compartment 14 of the vehicle 12 and is not limited to the front trunk of the vehicle 12. For example, the compartment 14 may be a passenger compartment, trunk compartment, or any other area or exterior cavity disposed in the vehicle 12. In general, the compartment 14 may form a thermally insulated space 16, which may be climate controlled via a climate control system 18 having at least one interface 20 for controlling environmental attributes of the space 16. For example, the climate control system 18 may be configured to control a temperature, a humidity, an airspeed, or the like in or through the space 16 via a controller 21 of or in communication with the climate control system 18. For example, the controller 21 may be configured to adjust fluid communication between the climate control system 18 and the thermal container. The at least one user interface 20 may be incorporated into a human-machine interface (HMI) 22 associated with a cabin of the vehicle 12 and/or may be incorporated into a mobile device 24, such as a phone, tablet, laptop, etc., for controlling the space 16 outside of the vehicle 12.

Although not shown in detail, the climate control system 18 may incorporate various heat control devices, such as a heat exchanger, that are configured to interface with the thermally managed storage system 10 of the present disclosure. In some examples, the climate control system 18 includes a heat control source 25 disposed in the vehicle 12 that is configured to control hot or cold air to be delivered to the compartment 14 or the thermal structure. For example, the climate control system 18 may include multiple heat exchangers and/or multiple sub climate control systems that allow isolated or combined control for one or more compartments 14 of the vehicle 12. In general, the climate control system 18 may be configured to provide cool or warm air toward the compartment 14. For example, the climate control system 18 may supply cool air and return warm air in order to reduce the temperature of the compartment 14 or devices in the compartment 14. As will be further described herein, a cooler or other structure may cover inlets and/or outlets of the climate control system 18 in the compartment 14 in order to heat or cool the cooler or other thermal structure.

In some examples, the climate control system 18 includes a dedicated heat pump system or another subsystem such as a heating, ventilation, and air conditioning (HVAC) system of the vehicle 12. In one example, the climate control system 18 is a dedicated dual-box heat pump system (e.g., a compact vehicle thermal management system (CVTMS)). Other exemplary thermal management systems may be employed to provide cool air to a cooler, a thermal box, or another structure in order to allow the thermal structure to utilize the climate control system 18 of the vehicle 12 to manage/control thermal properties inside of the cooler.

Figure 2:
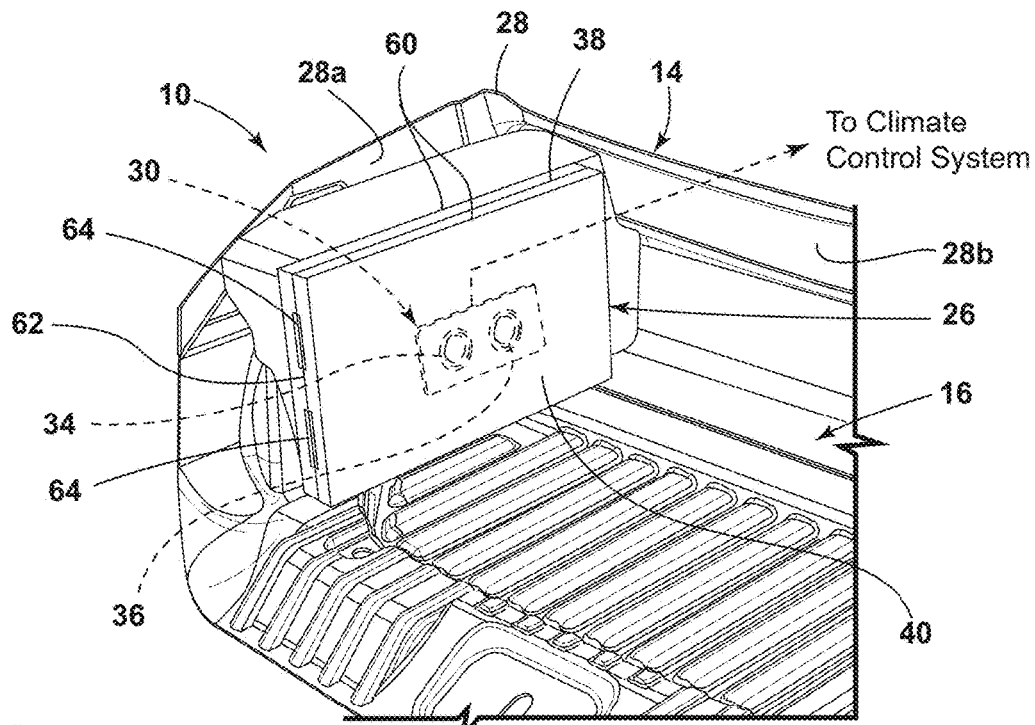
FIG. 2 is a perspective view of a partition structure in a folded position disposed in a compartment of a vehicle according to one aspect of the present disclosure.
Figure 3:
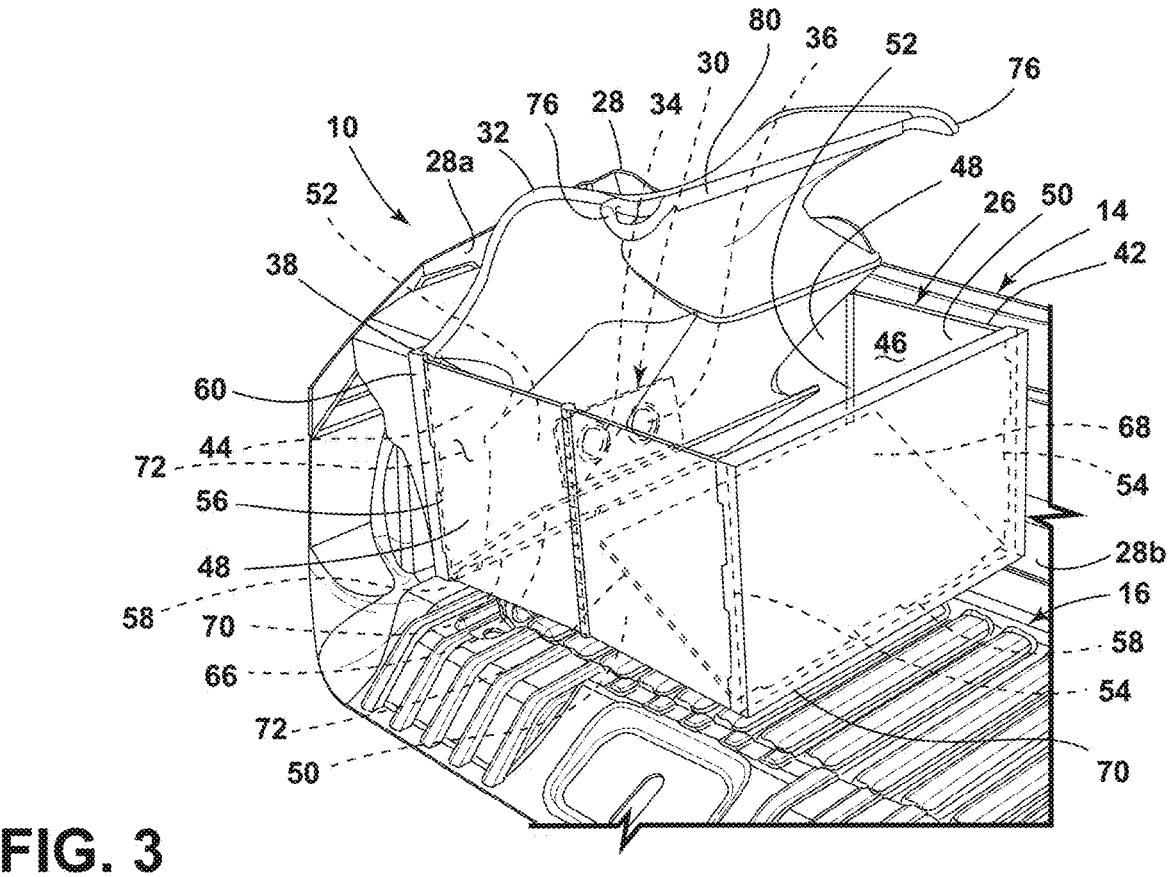
FIG. 3 is a perspective view of the partition structure of FIG. 2 in a partially unfolded position illustrating a casing of the thermally managed storage system within the partition structure according to one aspect of the present disclosure.
Figure 4:
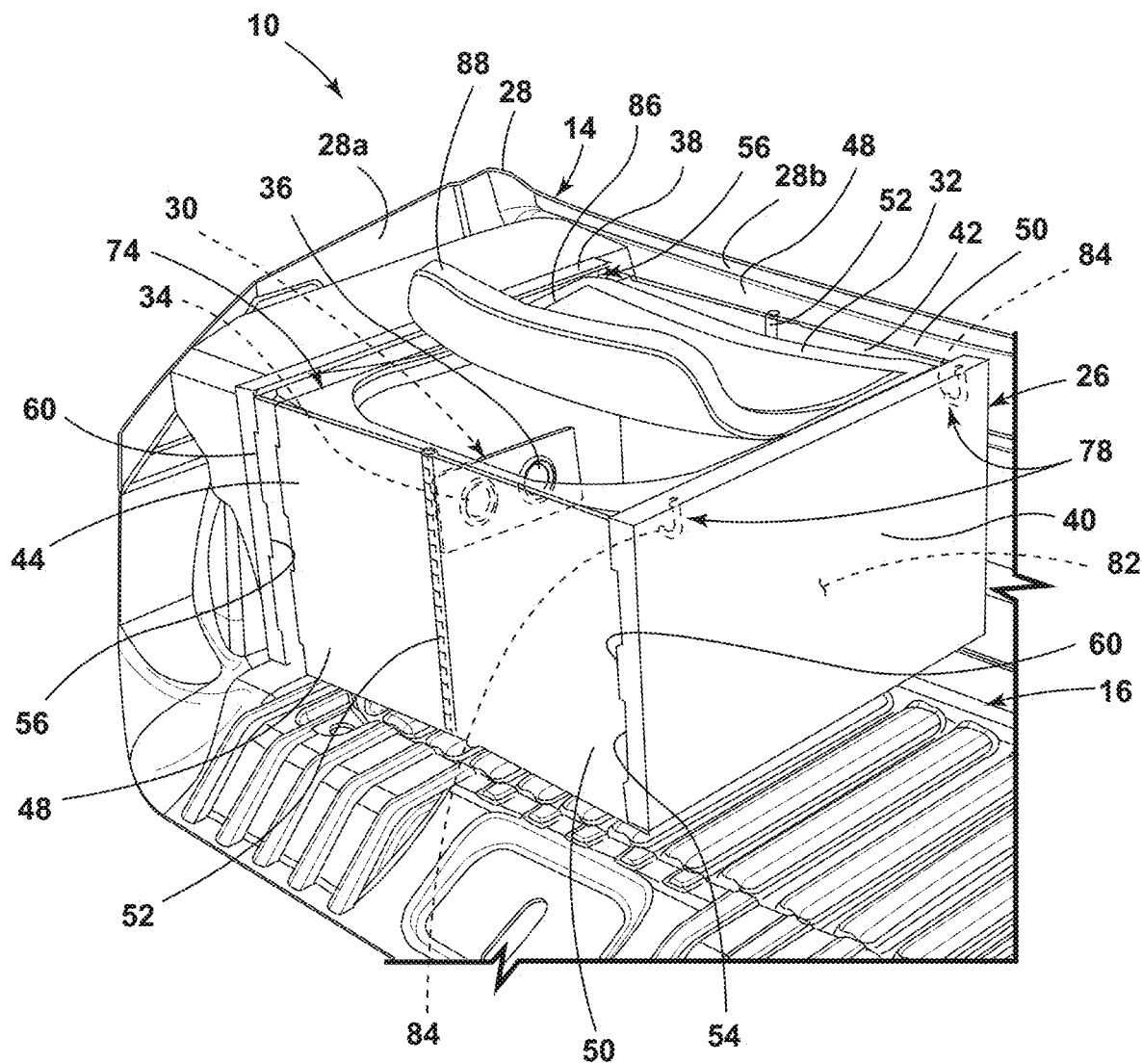
FIG. 4 is a perspective view of the thermally managed storage system of FIGS. 2 and 3 with the casing in a fully expanded position.
Figure 5:
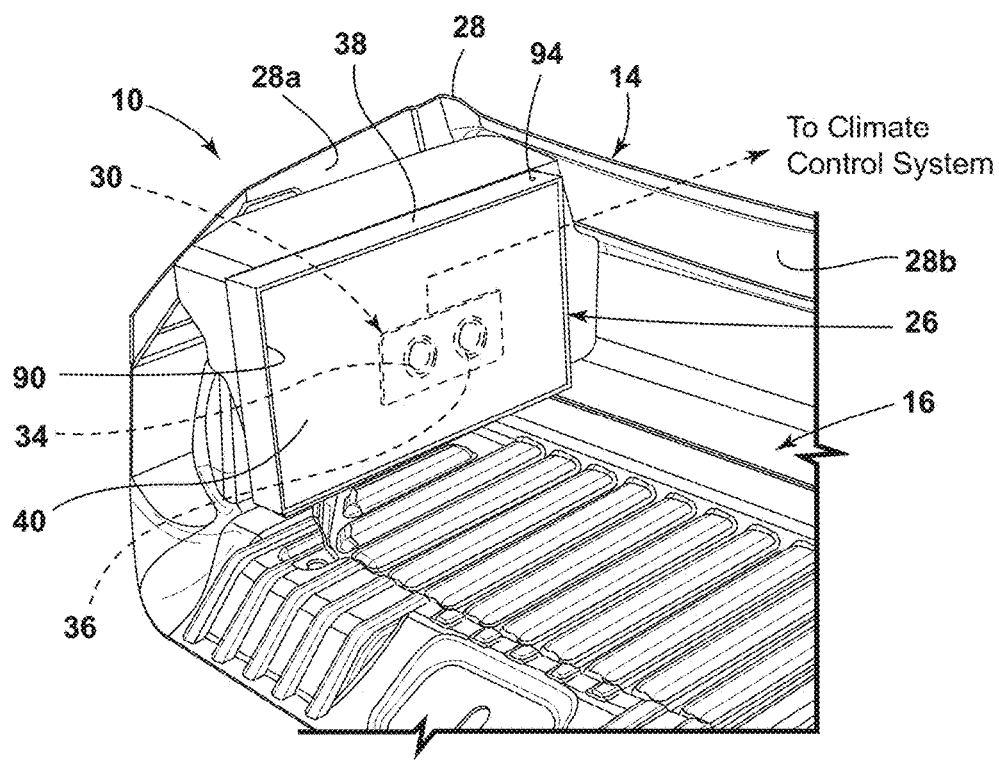
FIG. 5 is a perspective view of a partition structure of the thermally managed storage system according to another aspect of the present disclosure.

Referring now to FIGS. 2-4, the thermally managed storage system 10 includes a partition structure 26 mounted to an outer wall 28 of the compartment 14. It is contemplated that the partition structure 26 may be mounted to any outer wall 28 of the compartment 14, such as a lateral wall 28a as illustrated, or a back wall 28b. In general, the particular outer wall 28 that the partition structure 26 is mounted to may correspond to the location of a fluid connection coupling 30 for the compartment 14. A container 32 may be provided within the partition structure 26 and coupled with the coupling 30 along with the partition structure 26. The container 32 may be a bag, a box, or another expandable vessel configured to be heated or cooled via the climate control system 18. The coupling 30 may be disposed on the outer wall 28 and house at least one conduit 34, 36, such as an inlet port 34 and an outlet port 36, that is in communication with the climate control system 18. For example, cool air may be pumped into the compartment 14 or the container 32 and hot air may be drawn from the compartment 14 or the container 32 to reduce the temperature and/or draw heat from the container 32 or the compartment 14. In some examples, the coupling is configured to only deliver cool air to the container 32 and be shut off or otherwise disconnected from the compartment 14 if the container 32 is removed from attachment with the coupling 30. In some examples, the container 32 is selectively removable from the partition structure 26. In other examples, the container 32 and the partition structure 26 are removable together from the compartment 14 and thus disconnected both from the coupling 30.

Referring now to FIGS. 2 and 3 more particularly, the partition structure 26 is expandable in the compartment 14 of the vehicle 12 between a retracted position (FIG. 2) and an expanded position (FIG. 4). FIG. 3 illustrates a partially expanded configuration of the partition structure 26 to illustrate the various mechanisms allowing for the deployability of the partition structure 26 from the outer wall 28 of the compartment 14. The partition structure 26 includes a first wall 38 and a plurality of second walls 40, 42, 44 coupled with the first wall 38 that, when expanded, define a space 46 within the partition structure 26. The first wall 38 is fixed with the outer wall 28 of the compartment 14 and may interpose the casing 32 and the compartment 14. The plurality of second walls 40, 42, 44 may include an end wall 40, or end panel, and first and second sidewalls 42, 44 that extend between the end panel 40 and the first wall 38.

Each of the first and second sidewalls 42, 44 may be divided into two partitions 48, 50, with a first partition 48 pivotally connected with the first wall 38 and with a second partition 50 interconnecting the first wall 38 and the end wall 40. A first hinge 52 interposes the first and second partition 48, 50 to allow the first partition 48 to rotate relative to the second partitions 50 and vice versa. It is contemplated that the first hinge 52 may be a spring-loaded hinge, a barrel hinge, a concealed hinge, an overlay hinge, an offset hinge, or any other type of pivotable connection between two members. A pair of second hinges 54 may also be provided between the end wall 40 and each of the second partitions 50 to allow rotation of the second partitions 50 relative to the end wall 40. A plurality of third hinges 56 may further be provided between the first wall 38 and each first partition 48. Although discussed further below, a pair of fourth hinges 58 may also be included in the partition structure 26. The arrangement of the hinges 52, 54, 56, 58 being disposed about peripheral portions of the partition structure 26 and extending generally parallel to one another may allow expansion of the partition structure 26 without increasing a volume 42 or a width of the space 46 taken up by the partition structure 26 in the expanded position. Stated differently, the sidewalls 42, 44 may fold inwardly when the partition structure 26 is moved from the extended position toward the retracted position.

Each of the first wall 38 and the end wall 40 may include an outer rim 60, with each outer rim 60 facing one another and enclosing the sidewalls 42, 44 in the retracted position. As is illustrated in FIG. 2, in the retracted position, the second and third hinges 56, 58 may be exposed or visible along a side edge 62 of the partition structure 26. Indentations 64 may be formed along each outer rim 60 and correspond to connecting portions of the sidewalls 42, 44 that may rotate relative to the first wall 38 and the end wall 40 between the retracted position in the extended position.

With continued reference to FIG. 3, a pair of lower panels 66, 68 may be pivotally coupled with the first and end walls 38, 40 within the partition structure 26. For example, the pair of lower panels 66, 68 may include a first lower panel 66 pivotally coupled with the first wall 38 and a second lower panel 68 pivotably coupled with the end wall 40. In general, the pair of lower panels 66, 68 may be coupled along a bottom edge 70 of the first and end panels 38, 40 and be disposed within the outer rim 60 of the first and end panels 38, 40. The fourth hinges 58 may interconnect the lower panels 66, 68 along the bottom edge 70 and be configured to allow the lower panels 66, 68 to rotate downwardly and away from the wall to which the lower panel 66, 68 corresponds. For example, the first lower panel 66 may be configured to rotate away from the first wall 38 when the partition structure 26 is expanding from the retracted position to the extended position, and the second lower panel 68 may be configured to rotate away from the end panel 40 when the partition structure 26 is expanding from the retracted position to the extended position.

It is contemplated that the first, second, third, and fourth hinges 52, 54, 56, 58 described above may be in the form of an elastomeric hinge fastened to two parts along a common edge and allowing one part to rotate relative to the other part via flexing of the hinge member. For example, a flexible material may be employed between two parts that may allow bending or pivoting along an axis formed by the flexible material in a direction consistent with the common edge of the first and second parts. Thus, the hinges 52, 54, 56, 58 of the present disclosure may not include a fixed element and a mobile element, but rather be integrally formed of a single piece of flexible material interposing the first and second parts. For example, each first hinge 48 may be an elastomeric hinge, whereas the second, third, and fourth hinges 54, 56, 58 may be door-type hinges 52, 54, 56, 58 having a fixed element (e.g., a bracket defining a receptacle) and a mobile element (e.g., a rod disposed in the receptacle). These examples are nonlimiting, and it is contemplated that the hinges 52, 54, 56, 58 of the present disclosure may embody any of the previously described hinge types.

Referring now to FIGS. 3 and 4 more particularly, the container 32, or casing, may be sandwiched between the first panel 38 and the first lower panel 66 in the retracted position, such that lowering of the first lower panel 66 causes the casing 32 to expand, as illustrated in FIG. 3. It is also contemplated that the casing 32 may be fixedly coupled with the first wall 38 along an interior surface 72 of the first wall 38, such that interfacing with the fluid connection 30 is accomplished via interfacing of the first wall 38 with the outer wall 28. Upon expansion of the partition structure 26, the casing 32 may be pulled outwardly and stretched, or otherwise held in tension, between the first wall 38 and the end wall 40 to form a top portion 74 of the casing 32 extending across the space 46. The casing 32 may include a pair of fastening members 76, such as looped grips. At least one securing mechanism 78 may be disposed adjacent an upper edge of the end wall 40 for receiving an end 80 of the casing 32 corresponding to the location of the grips 76. The securing mechanism 78 is configured to receive the fastening mechanisms 76 to maintain the casing 32 in an expanded condition and define an interior of the casing 32 within the space 46. As illustrated in FIG. 4, the securing mechanisms 78 may be a plurality of hooks 84 that are configured to support the grips 76 and stretch the casing 32, though any type of fastener may be employed. The hooks 84 may extend downwardly from the rim or outwardly from an interior surface 82 of the end panel 40 to maintain rigidity of the top portion 74.

Referring now to FIG. 4, a closure device 86 may be provided along the top portion 74 of the casing 32 to allow selective opening or closing of a lid 88 of the casing 32. For example, the closing mechanism may be an interlocking fastener with mating teeth to allow the casing 32 to be zipped open or zipped shut. In operation, the user may pull the end wall 40 from the first wall 38 when the support structure is in the retracted position to expand the partition structure 26. The end wall 40 is configured to remain substantially parallel with the first wall 38 during movement of the plurality of second walls 40, 42, 44 between the retracted position and the extended position. In general, this may be allowed due to the rigidity of the partition structure 26 and the location of the hinges 52, 54, 56, 58. For example, because the pair of the second hinges 54 and the third hinges 56 may be spaced apart at a fixed distance, movement of the end panel 40 from the first panel 38 may have a consistent direction (e.g., perpendicularly from the outer wall 28). As the end wall 40 is pulled from the first wall 38, the pair of second hinges 54 are configured to translate relative to the first wall 38 during movement. Each first hinge 48 may also rotate relative to the end wall 40 during the movement. When in the retracted position, the thermally managed storage system 10 may have an order of arrangement. The order may include the casing 32 being disposed between the first wall 38 and the first lower panel 66. The first and second lower panels 66, 68 may be disposed between the first wall 38 and the end wall 40. The plurality of sidewalls 42, 44 may be disposed between the first and second lower panels 66, 68. This order may provide spatial optimization within the compartment 14 and allow for ease of use.

In general, the storage system 10 illustrated and described with respect to FIGS. 2-4 may have fully removable components relative to the compartment 14. For example, both the casing 32 and the partition structure 26 may be removed together from the compartment 14 in some examples. For example, because the casing 32 may be coupled with the interior surface 72 of the first wall 38, interfacing with the fluid connection coupling 30 may require both the first wall 38 and the casing 32. In general, the interior of the casing 32 may be in fluid communication with the climate control system 18 of the vehicle 12 when connected to the compartment 14. Further, the first wall 38 and the plurality of second walls 40, 42, 44 may be thermally insulated to limit heat transfer between the space 46 defined by the partition structure 26 and the remaining space within the compartment 14.

The materials employed for the casing 32 and the partition structure 26 may differ from one another, but in general are thermally insulative such that they may limit heat transfer. For example, the casing 32, or the container 32, may employ an elastomeric material that allows stretching of the casing 32. In such an example, it is contemplated that the partition structures 26 may be rigid or semi-rigid members to maintain the shape of the container 32 when the fastening mechanisms are coupled with the securing mechanisms 78. It is contemplated that the partition structure 26 may have a higher elastic modulus than the casing 32 and may generally be less flexible than the casing 32. Examples of materials employed for the casing 32 may include fabrics, polyester, cotton, and the like. The material employed for the partitioning structure 26 (e.g., the first, end, and second walls 38, 40, 42, 44) may include rigid materials that incorporate polyester and the like that may further include plastics or other materials that may provide rigidity to the panels.

Figure 6:
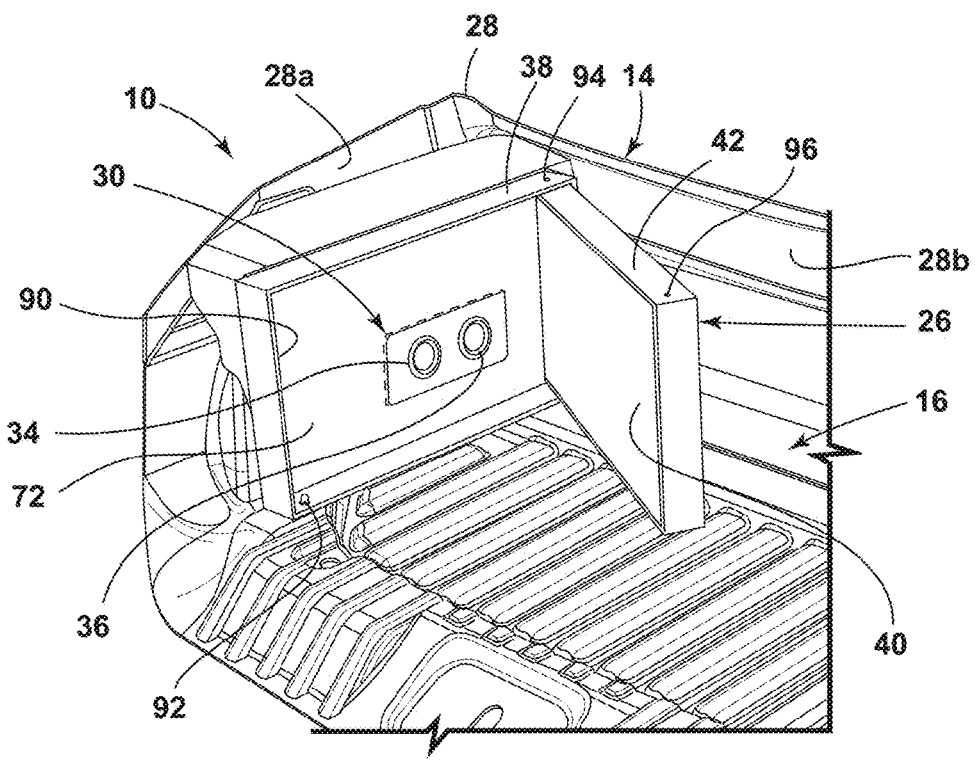
FIG. 6 is a perspective view of the partition structure of FIG. 5 in a first partially unfolded position.
Figure 7:
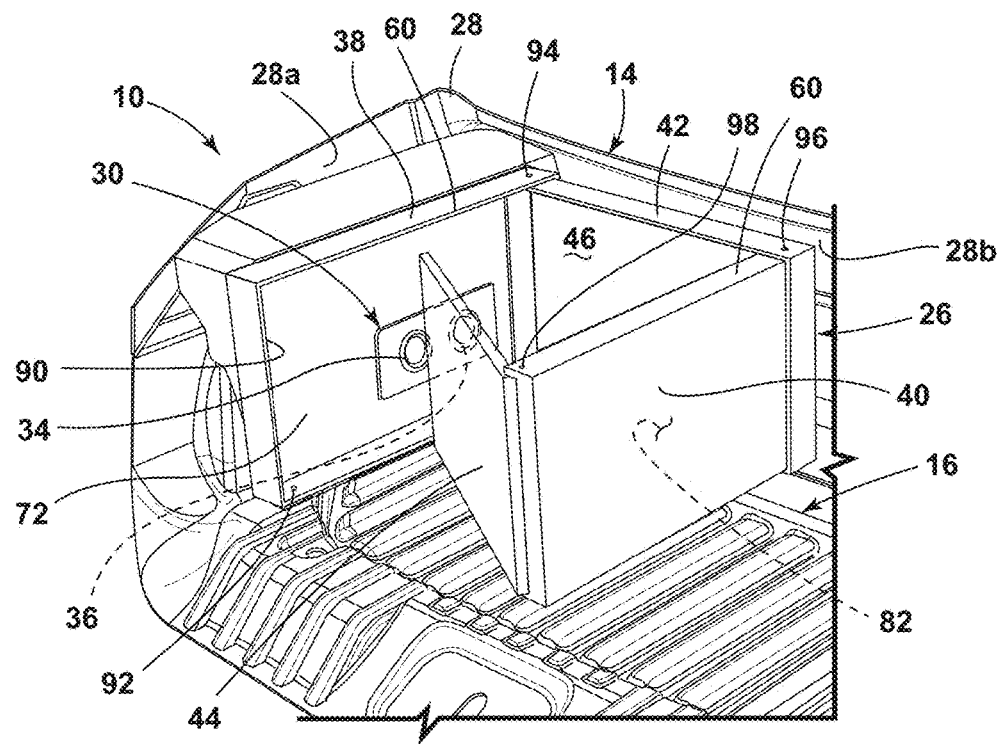
FIG. 7 is a perspective view of the partition structure of FIGS. 5 and 6 in a second partially unfolded position.
Figure 8:
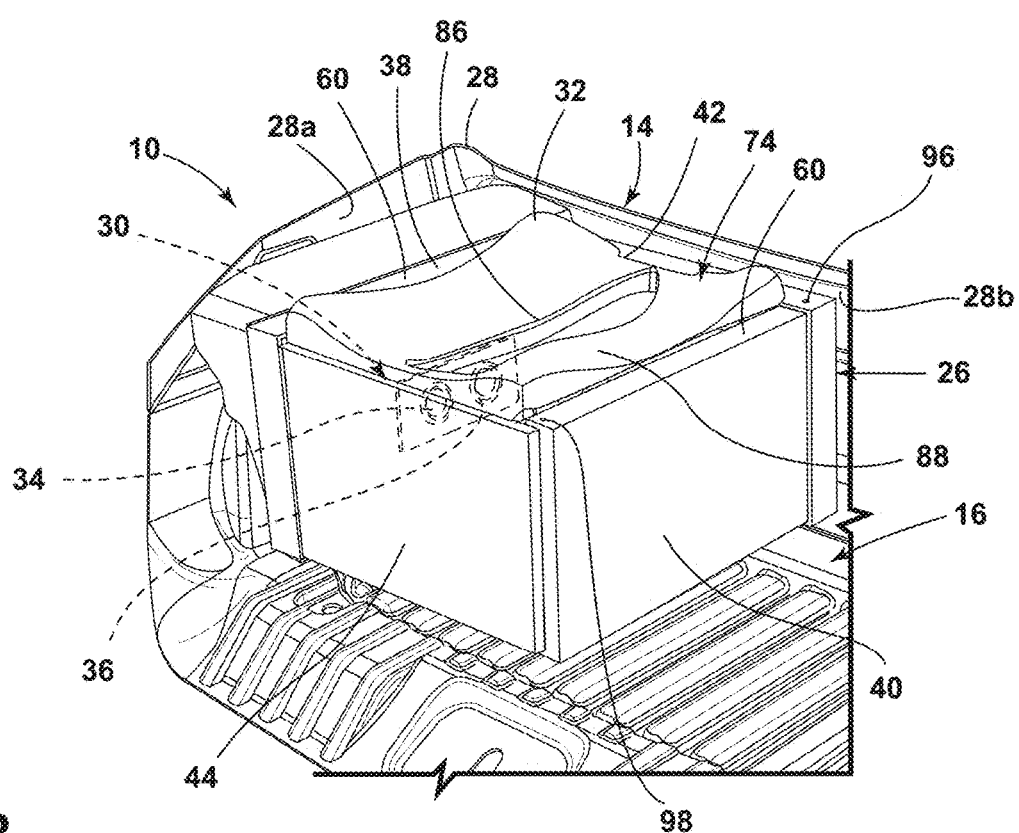
FIG. 8 is a perspective view of the partition structure of FIGS. 5-7 with a casing of the thermally managed storage system in an expanded position within the partition structure.

Referring now to FIGS. 5-8, another example of the thermally managed storage system 10 includes the partition structure 26 having the first wall 38 and the plurality of second walls 40, 42, 44 as previously described. In this example, the plurality of second walls 40, 42, 44 is configured to unfold in a sequential manner via the unfolding of the first sidewall 42 (FIG. 6), then unfolding of the end wall 40 (FIG. 7), then unfolding of the second sidewall 44 (FIG. 8). Accordingly, the space optimization and user-friendliness of the arrangement illustrated in FIGS. 2-4 may result via an unwinding/pop-out approach that may also save space within the compartment 14. In addition, a concealment partition 90 may extend from a periphery of the first wall 38 to conceal outer edges of the plurality of second walls 40, 42, 44 in the retracted position shown in FIG. 5. Thus, a slim fit for the partition structure 26 may be accomplished in this example.

Referring generally to FIGS. 6-8, the plurality of second walls 40, 42, 44 may have a sequential housing arrangement, such that the second sidewall 44 may be housed in the end wall 40, the end wall 40 and second sidewall 44 may be housed in the first sidewall 42, and the first sidewall 42, the end wall 40, and the second sidewall 44 may be housed in the first wall 38 in the retracted position. A retention member 92 may be disposed with the first wall 38 adjacent a connection point of the second sidewall 44 with the first wall 38 to maintain a position of the second wall 40, 42, 44 in the expanded position. In operation, the second sidewall 44 may be forced over the retention mechanism, which may be a protrusion or other cammed fit that restricts motion of the second sidewall 44. The retention member 92 may serve as an interface that selectively couples the second sidewall 44 with the first wall 38 when the plurality of second walls 40, 42, 44 are in the extended position.

Referring to FIGS. 7-8, a plurality of hinge members 94, 96, 98 may be disposed between various portions of the partition structure 26. For example, the first hinge member 94 may couple the first wall 38 of the first sidewall 42. A second hinge member 96 may couple the end wall 40 with the first sidewall 42 at an opposite end of the first sidewall 42. A third hinge member 98 may couple the second sidewall 44 with the end wall 40. The plurality of hinge members 94, 96, 98 may act cooperatively together to allow the second sidewall 44 to extend over the retention mechanism 92 into a fixed position corresponding to the extended position of the partition structure 26. Once in the extended position, the partition structure 26 may receive the casing 32 within the space 46, and the casing 32 may couple with the fluid connection coupling 30. Thus, in this example, the casing 32 may be removed from the partition structure 26 or may be housed within the partition structure 26 (e.g., sandwiched within the plurality of second sidewalls 40, 42, 44). Fluid communication between the container 32 and climate control system 18 may therefore take place at the inner surface 72 of the first wall 38, as opposed to a surface between the outer wall 28 of the compartment 14 and the first wall 38. In other words, in this example, the container 32 may be selectively removable from the partition structure 26 to break fluid communication with the climate control system 18 while the partition structure 26 remains coupled to the compartment 14.

Figure 9:
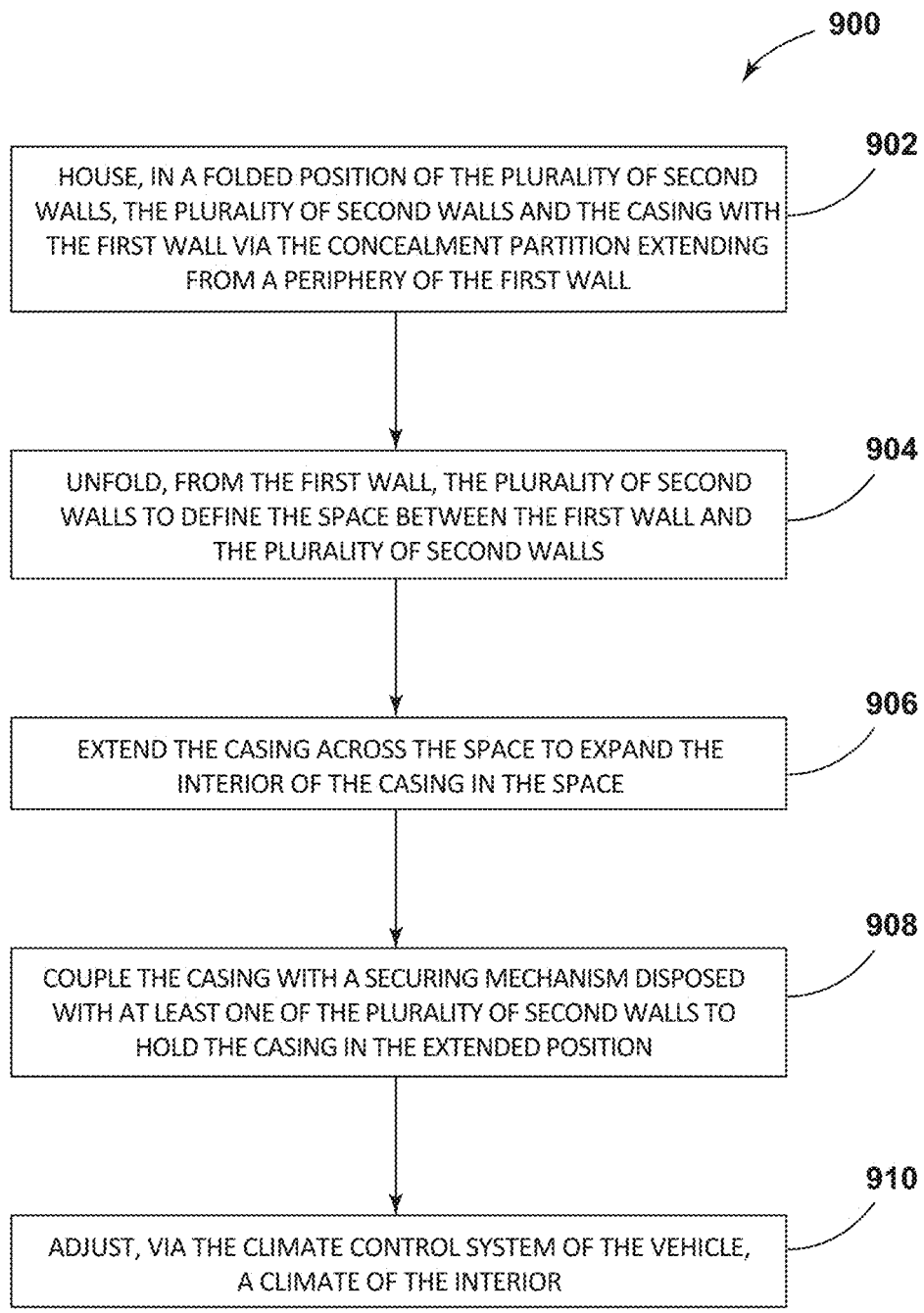
FIG. 9 is a method of operating a thermally managed storage system for a vehicle according to one aspect of the present disclosure.

Referring now to FIG. 9, a method 900 for operating the thermally managed storage system 10 of the present disclosure includes housing the plurality of second walls 40, 42, 44, in the first wall 38 via the concealment partition 90 when the second walls 40, 42, 44 are in a folded position at step 902. At step 904, the plurality of second walls 40, 42, 44 is unfolded from the first wall 38 to define the space 46 between the first wall 38 on the plurality of second walls 40, 42, 44. The method 900 further includes extending the casing 32 across the space 46 to expand the interior of the casing 32 in the space 46 at step 906. At step 908, the casing 32 is coupled with the securing mechanism 78 disposed with at least one of the plurality of second walls 40, 42, 44 to hold the casing 32 in the extended position. The method 900 further includes adjusting, via the climate control system 18 of the vehicle 12, a climate of the interior at step 910.

Incorporation of the present thermal management system 10 in a frunk of the vehicle 12 may provide for greater accessibility and ease of connection with an on-board HVAC system relative to cooperation with other compartments of the vehicle 12, such as the cabin, trunk, or bed of the vehicle 12. For example, the frunk may be proximate to a dashboard of the cabin in which at least one HVAC system of the vehicle 12 may be positioned relative to a trunk of the vehicle 12. In addition, incorporation into the frunk of the vehicle 12 may allow for condensation, spillage, or other fluids to drain from the container 32 to exit the vehicle. Further, incorporation of the thermal management system 10 in an area separate from the cabin of the vehicle 12 may allow for access to a separate region from the cabin that is climate-controlled.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A thermally managed storage system for a vehicle, comprising:
 a partition structure coupled with and expandable in a compartment of the vehicle, the partition structure including a first wall fixed with the compartment and a plurality of second walls each moveable between a retracted position and an extended position, wherein the plurality of second walls forms a space between the first wall and the plurality of second walls in the extended position; and
 a casing disposed in the compartment and selectively coupling with a climate control system of the vehicle via a fluid connection with the compartment.

2. The system of claim 1, wherein the plurality of second walls includes first and second sidewalls and an end wall extending between the first and second sidewalls.

3. The system of claim 2, further comprising:
a first hinge member coupling the first wall with the first sidewall, a second hinge member coupling the end wall with the first sidewall, and a third hinge member coupling the second sidewall with the end wall.

4. The system of claim 3, further comprising:
an interface selectively coupling the second sidewall with the first wall when the plurality of second walls are in the extended position.

5. The system of claim 4, wherein the casing is selectively removable from the fluid connection and the compartment, and wherein the partition structure is fixed with the compartment.

6. The system of claim 2, wherein the end wall is configured to remain substantially parallel with the first wall during a movement of the plurality of second walls between the retracted and extended positions.

7. The system of claim 6, wherein each of the plurality of sidewalls includes a first partition and a second partition coupled together via a first hinge.

8. The system of claim 7, further comprising a pair of second hinges interconnecting the second partitions with the end wall, wherein the pair of second hinges are configured to translate relative to the first wall during the movement, and each first hinge is configured to rotate relative to the end wall during the movement.

9. The system of claim 2, further comprising:
at least one lower panel pivotally coupled with at least one of the first wall and the end wall to form a floor of the partition structure when unfolded.

10. The system of claim 9, wherein the at least one lower panel includes a first lower panel pivotably coupled with the first wall and a second lower panel pivotably coupled with the end wall.

11. The system of claim 10, wherein the casing, the plurality of second walls, and the first and second lower panels have an order in the retracted position, the order including the casing disposed between the first wall and the first lower panel, the first and second lower panels disposed between the first wall and the end wall, and the plurality of sidewalls disposed between the first and second lower panels.

12. The system of claim 2, further comprising:
securing mechanisms disposed adjacent an upper edge of the end wall for receiving one end of the casing, wherein the securing mechanisms are configured to support the casing to form a top portion of the casing extending across the space.

13. The system of claim 1, wherein the casing defines an interior in fluid communication with the climate control system of the vehicle.

14. The system of claim 1, further comprising:
a concealment partition extending from a periphery of the first wall to conceal outer edges of the plurality of second walls.

15. The system of claim 1, wherein the first and plurality of second walls are thermally insulated to limit heat transfer between the space and a remainder of the compartment.

16. A method of operating a thermally managed storage system for a vehicle, the method comprising:
unfolding, from a first wall coupled with a compartment of the vehicle, a plurality of second walls to define a space between the first wall and the plurality of second walls;
extending a casing coupled with the first wall across the space to expand an interior of the casing in the space;
coupling the casing with a securing mechanism disposed with at least one of the plurality of second walls to hold the casing in an extended position;
adjusting, via a climate control system of the vehicle, a climate of the interior, the climate control system including a fluid connection with the interior at the first wall; and
housing, in a folded position of the plurality of second walls, the plurality of second walls and the casing with the first wall via a concealment partition extending from a periphery of the first wall.

17. A thermally managed storage system for a vehicle, comprising:
a partition structure coupled with and expandable in a compartment of the vehicle, the partition structure including a first wall fixed with the compartment and a plurality of second walls each moveable between a retracted position and an extended position, wherein the plurality of second walls forms a space between the first wall and the plurality of second walls in the extended position; and
a casing disposed in the compartment and selectively coupling with a climate control system of the vehicle via a fluid connection with the compartment; and
a concealment partition extending from a periphery of the first wall to conceal outer edges of the plurality of second walls.

18. The system of claim 17, wherein the end wall is configured to remain substantially parallel with the first wall during a movement of the plurality of second walls between the retracted and extended positions.

19. The system of claim 17, further comprising:
a controller in communication with the climate control system configured to adjust fluid communication between the climate control system and an interior of the casing.

20. The system of claim 19, wherein the partition structure is configured to selectively decouple from the compartment and selectively decouple the casing from the fluid connection.

* * * * *